(12) United States Patent
Suhara et al.

(10) Patent No.: US 7,381,498 B2
(45) Date of Patent: Jun. 3, 2008

(54) POSITIVE ELECTRODE ACTIVE MATERIAL POWDER FOR LITHIUM SECONDARY BATTERY

(75) Inventors: Manabu Suhara, Chigasaki (JP); Takuya Mihara, Chigasaki (JP); Koichiro Ueda, Chigasaki (JP); Yukimitsu Wakasugi, Chigasaki (JP)

(73) Assignee: Seimi Chemical Co., Ltd., Chigasaki-shi (JP)

( * ) Notice: Subject to any disclaimer, the term of this patent is extended or adjusted under 35 U.S.C. 154(b) by 27 days.

(21) Appl. No.: 11/150,451

(22) Filed: Jun. 13, 2005

(65) Prior Publication Data

US 2005/0271944 A1 Dec. 8, 2005

Related U.S. Application Data

(63) Continuation of application No. PCT/JP04/12015, filed on Aug. 20, 2004.

(30) Foreign Application Priority Data

Aug. 21, 2003 (JP) ............................... 2003-208311

(51) Int. Cl.
 H01M 4/58 (2006.01)
 H01M 4/00 (2006.01)
 H01M 4/50 (2006.01)
 H01M 4/52 (2006.01)

(52) U.S. Cl. .............................. 429/231.95; 429/231.1; 429/231.3; 429/223; 429/224; 429/231.5; 429/231; 423/594.4; 423/594.6; 423/599

(58) Field of Classification Search ........... 429/231.95, 429/231.1, 231.3, 223, 224, 231.5, 231; 423/594.4, 423/594.6, 599
 See application file for complete search history.

(56) References Cited

FOREIGN PATENT DOCUMENTS

| JP | 3-201368 | | 9/1991 |
|---|---|---|---|
| JP | 08-224490 | | 9/1996 |
| JP | 10-312805 | | 11/1998 |
| JP | 200-082466 | * | 3/2000 |
| JP | 2000-82466 | | 3/2000 |
| JP | 2000-082466 | * | 3/2000 |
| JP | 2000-353510 | | 12/2000 |
| JP | 2001-080920 | * | 3/2001 |
| JP | 2004-220897 | * | 8/2004 |
| WO | WO 95/28011 | | 10/1995 |

* cited by examiner

Primary Examiner—Patrick Joseph Ryan
Assistant Examiner—Angela J. Martin
(74) Attorney, Agent, or Firm—Oblon, Spivak, McClelland, Maier & Neustadt, P.C.

(57) ABSTRACT

To provide a lithium-nickel-cobalt-manganese composite oxide powder for a positive electrode of a lithium secondary battery, which has a large volume capacity density and high safety and is excellent in the charge and discharge cyclic durability. A positive electrode active material powder for a lithium secondary battery characterized by comprising a first granular powder having a compression breaking strength of at least 50 MPa and a second granular powder having a compression breaking strength of less than 40 MPa, formed by agglomeration of many fine particles of a lithium composite oxide represented by the formula $Li_pNi_xCo_yMn_zM_qO_{2-a}F_a$ (wherein M is a transition metal element other than Ni, Co and Mn, Al or an alkaline earth metal element, $0.9 \leq p \leq 1.1$, $0.2 \leq x \leq 0.8$, $0 \leq y \leq 0.4$, $0 \leq z \leq 0.5$, $y+z>0$, $0 \leq q \leq 0.05$, $1.9 \leq 2-a \leq 2.1$, $x+y+z+q=1$ and $0 \leq a \leq 0.02$) to have an average particle size D50 of from 3 to 15 μm, in a weight ratio of the first granular powder/the second granular powder being from 50/50 to 90/10.

9 Claims, No Drawings

POSITIVE ELECTRODE ACTIVE MATERIAL POWDER FOR LITHIUM SECONDARY BATTERY

BACKGROUND OF THE INVENTION

1. Field of the Invention

The present invention relates to a positive electrode active material powder for a lithium secondary battery, which has a large volume capacity density and high safety and is excellent in the charge and discharge cyclic durability, a positive electrode for a lithium secondary battery containing such a powder, and a lithium secondary battery.

2. Discussion of Background

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-cobalt composite oxide ($LiCoO_2$) as a positive electrode active material and using a lithium alloy or carbon such as graphite or carbon fiber as a negative electrode, can obtain a high voltage at a level of 4V, whereby it has been widely used as a battery having a high energy density.

However, in the case of the non-aqueous type secondary battery using $LiCoO_2$ as a positive electrode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycle, a problem of the weight capacity density or substantial reduction of the discharge capacity at a low temperature.

In order to solve these problems, it has been proposed in patent document 1 that the average particle size of $LiCoO_2$ as a positive electrode active material, be from 3 to 9 am, the volume occupied by a group of particles having a particle size of from 3 to 15 µm, be at least 75% of the total volume, and the intensity ratio of the diffraction peaks at 2θ=about 19° and 45° as measured by means of X-ray diffraction using CuKα as a radiation source, be of a specific value, so that it becomes an active material excellent in the coating properties, the self-discharge properties and the cyclic properties. Further, in the patent document 1, it has been proposed that the positive electrode active material is preferably one which does not substantially have such a particle size distribution that the particle size of $LiCoO_2$ is 1 µm or smaller or 25 µm or larger. With such a positive electrode active material, the coating properties and the cyclic properties have been improved, but, the safety, the volume capacity density and the weight capacity density, have not yet been fully satisfactory.

Further, in order to improve the weight capacity density and the charge and discharge cyclic properties of the positive electrode, patent document 2 proposes a positive electrode active material wherein the average particle size of lithium composite oxide particles is from 0.1 to 50 µm, and at least two peaks are present in the particle size distribution. Further, it has been proposed to mix two types of positive electrode active materials having different average particle sizes to prepare a positive electrode active material wherein at least two peaks are present in the particle size distribution. In such a proposal, there may be a case where the weight capacity density and the charge and discharge cyclic properties of the positive electrode can be improved, but on the other hand, there is a complication that the positive electrode material powders having two types of particle size distributions have to be produced, and one satisfying all of the volume capacity density, the safety, the coating uniformity, the weight capacity density and the cyclic properties of the positive electrode, has not yet been obtained.

Further, patent document 3 proposes to replace 5 to 35% of Co atoms in $LiCoO_2$ with W, Mn, Ta, Ti or Nb to improve the cyclic properties. Further, patent document 4 proposes to use hexagonal $LiCoO_2$ as a positive electrode active material to improve the cyclic properties, wherein the c axis length of the lattice constant is at most 14.051 Å, and the crystal lattice size of (110) direction of the crystal lattice is from 45 to 100 nm.

Further, patent document 5 proposes a granular lithium composite oxide having a compression breaking strength per grain of from 0.1 to 1.0 gf, which has the formula $Li_xNi_{1-y-z}Co_yMe_zO_2$ (wherein $0<x<1.1$, $0<y\leq0.6$, and $0\leq z\leq0.6$) and which is an agglomerated granular lithium composite oxide formed by agglomeration of a fine powder. However, such a composite oxide has a problem that the safety is poor, and the large current discharge properties are inferior. Besides, with such a small range of compression breaking strength, it is not possible to obtain a lithium composite oxide having adequately satisfactory properties with respect to e.g. the volume capacity density, the safety, the cyclic properties and the large current discharge properties.

Patent Document 1: JP-A-6-243897
Patent Document 2: JP-A-2000-82466
Patent Document 3: JP-A-3-201368
Patent Document 4: JP-A-10-312805
Patent Document 5: JP-A-2001-80920

SUMMARY OF THE INVENTION

As described above, heretofore, a positive electrode active material of a lithium composite oxide which fully satisfies the volume capacity density, the safety, the cyclic properties, the large current discharge properties, etc. in a lithium secondary battery, has not yet been obtained. It is an object of the present invention to provide a positive electrode active material powder for a lithium secondary battery, which satisfies such properties that have been difficult to accomplish by such prior art, a positive electrode for a lithium secondary battery containing such a powder, and a lithium secondary battery.

The present inventors have conducted an extensive study and have paid attention to the relation between the compression breaking strength of an agglomerated granular composite oxide powder having a specific average particle size, formed by agglomeration of many fine particles of a lithium composite oxide having a specific composition, and the volume capacity density of a positive electrode for a lithium secondary battery employing such a powder, whereby it has been found that by combined use of a first composite oxide powder having a high compression breaking strength and a second composite oxide powder having a low compression breaking strength in a specific ratio, a positive electrode having a synergistically high packing property can be formed i.e. the obtainable positive electrode has a synergistically large volume capacity density. Further, it has been confirmed that such a large volume capacity density of the positive electrode can be accomplished without impairing other properties required for the positive electrode, such as the volume capacity density, the safety, the cyclic properties and the large current discharge properties.

Thus, the present invention is characterized by having the following constructions.

(1) A positive electrode active material powder for a lithium secondary battery characterized by comprising a first granular powder having a compression breaking strength of at least 50 MPa and a second granular powder having a compression breaking strength of less than 40 MPa, formed by agglomeration of many fine particles of a lithium composite oxide represented by the formula $Li_pNi_xCo_yMn_zM_qO_{2-a}F_a$ (wherein M is a transition metal element other than Ni, Co and Mn, Al or an alkaline earth metal element, $0.9 \leq p \leq 1.1$, $0.2 \leq x \leq 0.8$, $0 \leq y \leq 0.4$, $0 \leq z \leq 0.5$, y+z>0, $0 \leq q \leq 0.05$, $1.9 \leq 2-a \leq 2.1$, x+y+z+q=1, and $0 \leq a \leq 0.02$) to have an average particle size D50 of from 3 to 15 μm, in a weight ratio of the first granular powder/the second granular powder being from 50/50 to 90/10.

(2) The positive electrode active material powder for a lithium secondary battery according to the above (1), wherein M is at least one element selected from the group consisting of Ti, Zr, Hf, V, Nb, Ta, Mg, Ca, Sr, Ba and Al.

(3) The positive electrode active material powder for a lithium secondary battery according to the above (1), wherein M is at least one element selected from the group consisting of Ti, Zr, Hf, Mg and Al.

(4) The positive electrode active material powder for a lithium secondary battery according to the above (1), (2) or (3), wherein the ratio of the compression strength of the first granular powder/the compression strength of the second granular powder is from 65/30 to 200/10.

(5) The positive electrode active material powder for a lithium secondary battery according to any one of the above (1) to (4), wherein the specific surface area of the positive electrode active material powder is from 0.3 to 2.0 m$^2$/g, and the grain shape is substantially spherical.

(6) The positive electrode active material powder for a lithium secondary battery according to any one of the above (1) to (5), wherein the press density of the positive electrode active material powder is from 3.1 to 3.4 g/cm$^3$.

(7) A positive electrode for a lithium secondary battery containing the positive electrode active material powder as defined in any one of the above (1) to (6).

(8) A lithium secondary battery employing the positive electrode as defined in the above (7).

According to the present invention, a lithium-nickel-cobalt-manganese composite oxide powder for a positive electrode of a lithium secondary battery, which has large initial volume discharge capacity density and initial weight discharge capacity density, and high initial charge and discharge efficiency, charge and discharge cyclic stability, and safety, a positive electrode for a lithium secondary battery containing such a lithium-nickel-cobalt-manganese composite oxide powder, and a lithium secondary battery, will be provided.

The technical concept found by the present invention such that a higher volume capacity density can be obtained by using the above-mentioned two types of lithium composite oxide granular powders different in the compression breaking strength, is basically different from the conventional technique as disclosed in patent document 5 wherein the compression breaking strength of a lithium composite oxide powder for a positive electrode of a lithium secondary battery is controlled within a prescribed range so that it should not be made larger than the prescribed level.

Namely, the compression breaking strength of the first agglomerated granular powder of the lithium composite oxide to be used in the present invention is remarkably large as compared with the range disclosed in patent document 5, while the compression breaking strength of the second agglomerated granular powder of the lithium composite oxide is remarkably small as compared with the range disclosed in patent document 5. In the present invention, it is not intended to control the compression breaking strength of a single type of a lithium composite oxide powder within a prescribed range as disclosed in patent document 5. However, the volume capacity density of the positive electrode active material thereby obtained by the present invention is remarkably superior to the one disclosed in patent document 5.

The reason as to why a positive electrode having a large volume capacity density can be obtained by the present invention by incorporating such two types of lithium composite oxide powders different in the compression breaking strength in such a specific ratio, is not necessarily clearly understood, but it is considered as follows. When a positive electrode is formed by compacting the lithium composite oxide agglomerated powder, the compression stress energy will be concentrated to a composite oxide granular powder having a low compression breaking strength, whereby the above-mentioned second granular powder will be broken and ultrafinely pulverized. And, such an ultrafinely pulverized powder will be filled up into spaces among the first granular particles having a high compression breaking strength used together and will be packed in a high density thereby leading to a highly packed positive electrode active material as a whole. It is considered that consequently, a positive electrode having a large volume capacity density can be obtained.

DETAILED DESCRIPTION OF THE PREFERRED EMBODIMENTS

The lithium-nickel-cobalt-manganese composite oxide powder for a positive electrode of a lithium secondary battery of the present invention is represented by the formula $Li_pNi_xCO_yMn_zM_qO_{2-a}F_a$. In the formula, M, p, x, y, z, q and a are as defined above. Particularly, p, x, y, z, q and a are preferably as follows. $0.98 \leq p \leq 1.05$, $0.25 \leq x \leq 0.60$, $0.10 \leq y \leq 0.35$, $0.10 \leq z \leq 0.42$, $0 \leq q \leq 0.02$, $1.95 \leq 2-a \leq 2.05$, x+y+z+q=1, $0 \leq a \leq 0.01$, and $0.94 \leq x/z \leq 1.06$. Here, when a is larger than 0, it is a composite oxide having some of its oxygen atoms substituted by fluorine atoms. In such a case, the safety, the initial charge and discharge efficiency or the initial discharge capacity, of the obtained positive electrode active material, will be improved. Particularly when $0.94 \leq x/z \leq 1.06$, a high capacity or a high cyclic durability can be obtained.

The lithium composite oxide powder of the present invention contains Ni and Co or Mn as essential components. When Ni is contained within the numerical value range of x in the above formula, the discharge capacity will be improved. If x is less than 0.2, the discharge capacity tends to be low. On the other hand, if it exceeds 0.8, the safety will be low, such being undesirable. Further, when Mn is contained within the numerical value range of z in the above formula, the safety will be improved. If z exceeds 0.5, the discharge capacity tends to be low, or the large current discharge properties tend to be low, such being undesirable.

Further, M is a transition metal element other than Ni, Co and Mn, Al or an alkaline earth metal. The transition metal element represents a transition metal of Group 4, Group 5, Group 6, Group 7, Group 8, Group 9, Group 10 or Group 11 of the Periodic Table. Among them, M is preferably at least one element selected from the group consisting of Ti, Zr, Hf, V, Nb, Ta, Mg, Ca, Sr, Ba and Al. Among them, M is preferably at least one element selected from the group consisting of Ti, Zr, Hf, Mg and Al from the viewpoint of the capacity development properties, the safety, the cyclic durability, etc.

In the present invention, in a case where the above M and/or F is contained, each of M and F is preferably present on the surface of the lithium composite oxide particles. If it is present in the interior of the particles, not only the effect of improving the battery characteristics tends to be small, but also the battery characteristics may decrease in some cases. By the presence of these elements on the surface of the particles, the important battery characteristics such as the safety or the charge and discharge cyclic properties can be improved by an addition of a small amount without bringing about the reduction of the battery performance. The presence of M and F on the surface can be judged by carrying out a spectroscopic analysis such as a XPS analysis with respect to the positive electrode particles.

The lithium composite oxide of the present invention is required to be a granular powder formed by agglomeration of many fine particles represented by the above formula. Such fine particles are not particularly limited, but their average particle size D50 (hereinafter referred to also as a volume average particle size) is preferably from 0.5 to 7 μm. And, the average particle size D50 of the composite oxide powder formed by agglomeration of many fine particles is preferably from 3 to 15 μm, more preferably from 5 to 12 μm. If the average particle size of the composite oxide powder is smaller than 3 μm, it tends to be difficult to form a dense electrode layer. On the other hand, if it is larger than 15 μm, the large current discharge properties tend to decrease, such being undesirable.

Further, the first granular powder of the present invention made of the above lithium composite oxide, is required to have a compression breaking strength (hereinafter sometimes referred to simply as a compression strength) of at least 50 MPa. If the compression strength is smaller than 50 MPa, it tends to be difficult to form a dense electrode layer, and the electrode density tends to be low. It is particularly preferred that the compression strength is from 80 to 300 MPa. Further, the second granular powder of the present invention made of the above lithium composite oxide, is required to have a compression strength of at most 40 MPa. If the compression strength is larger than 40 MPa, it tends to be difficult to form a dense electrode layer, and the electrode density tends to be low. It is particularly preferred that the compression strength is from 10 to 30 MPa. In the present invention, the composition of the first granular powder and the composition of the second granular powder may be the same or different.

The object of the present invention is accomplished when the compression strengths of the two types of granular lithium composite oxide powders i.e. the first granular powder and the second granular powder, have the numerical values within the above ranges, respectively. Further, the ratio of the compression strength of the first granular powder/the compression strength of the second granular powder is preferably from 65/30 to 200/10, particularly preferably from 70/25 to 150/15. Within such a ratio, the object of the present invention can be certainly accomplished.

In the present invention, the compression strength (St) is a value obtained by the formula of HIRAMATSU et al. ("Journal of the Mining and Metal Logical Institute of Japan", vol. 81, Number 932, December 1965, p. 1024-1030) shown by the following formula 1.

$$St=2.8P/\pi d^2 \text{ (}d\text{: particle size, } P\text{: load exerted to particle)} \quad \text{Formula 1}$$

The positive electrode active material for a lithium secondary battery of the present invention comprises the first granular powder and the second granular powder in a weight ratio of the first granular powder/the second granular powder being from 50/50 to 90/10. This content ratio is important, and if the content ratio is smaller than 50/50, the electrode packing property tends to be low, and if it exceeds 90/10, the effect for improvement of the electrode packing property tends to be small, whereby the object of the present invention tends to be hardly accomplished. Particularly, the content ratio is preferably from 60/40 to 85/15, more preferably from 70/30 to 80/20. In the present invention, the first granular powder and the second granular powder are uniformly mixed preferably by means of an apparatus such as an axial mixer or a drum mixer.

Further, the specific surface area of the positive electrode active material obtained from the lithium composite oxide of the present invention is preferably from 0.3 to 2.0 m$^2$/g, particularly preferably from 0.4 to 1.0 m$^2$/g. The shape of particles is preferably substantially spherical such as spherical or oval. When the lithium composite oxide satisfies such properties, the effects such as the high capacity, the high cyclic durability and the high safety, can be accomplished.

Further, the press density of the positive electrode active material of the lithium composite oxide of the present invention is preferably from 3.1 to 3.4 g/cm$^3$, particularly preferably from 3.15 to 3.3 g/cm$^3$. Here, the press density in the present invention is meant for an apparent press density when the granular powder is compressed under a pressure of 1.96 t/cm$^2$. It is a feature of the present invention that the positive electrode active material has such a large press density, whereby a high volume capacity density can be obtained.

The lithium composite oxide of the present invention is formed by firing a mixture comprising a lithium source, a nickel source, a cobalt source, a manganese source, and an element M source and a fluorine source to be used as the case requires, at from 700 to 1,050° C.

As the lithium source, lithium carbonate or lithium hydroxide may, for example, be used. However, it is particularly preferred to use lithium carbonate. When lithium carbonate is used as the lithium source, the cost will be low as compared, for example, with a case where lithium hydroxide is used, and an inexpensive high performance lithium-nickel-cobalt-manganese composite oxide desired in the present invention can easily be obtained, such being preferred. Further, as the nickel, cobalt and manganese sources, a nickel-cobalt-manganese composite oxyhydroxide may, for example, be employed. On the other hand, as the material for element M to be used as the case requires, a hydroxide, an oxide, a carbonate or a fluoride may preferably be selected for use. As the fluorine source, a metal fluoride, LiF or MgF$_2$ may, for example, be selected for use.

If the above firing temperature is lower than 700° C., lithium-modification tends to be incomplete. On the other hand, if it exceeds 1,050° C., the charge and discharge cyclic durability and the initial capacity tend to be low. The firing temperature is particularly carried out in multi-stages. As a preferred example, a case may be mentioned wherein firing is carried out at 700° C. for a few hours, followed by firing at a temperature of from 900 to 1,000° C. for a few hours.

A powder mixture comprising a lithium source, a nickel source, a cobalt source, a manganese source and an element M source and a fluorine source to be used as the case requires, is subjected to firing treatment at a temperature of from 700 to 1,050° C. as mentioned above, in an oxygen-containing atmosphere for from 5 to 20 hours, and the obtained fired product is cooled, then pulverized and classified, to obtain an agglomerated granular composite oxide powder formed by agglomeration of fine particles of lithium-nickel-cobalt-manganese composite oxide of preferably from 0.3 to 7 µm. In such a case, it is possible to control the compression strength and the average particle size of the agglomerated granular composite oxide powder to be formed, by selecting the nature of the raw materials such as the cobalt source, or the conditions such as the firing temperature, firing time, etc. for lithiation.

In a case where a positive electrode of a lithium secondary battery is produced from such a lithium composite oxide, a binder material and a carbon type electroconductive material such as acetylene black, graphite or ketjenblack, may be mixed to the powder of such a composite oxide. As such a binder material, polyvinylidene fluoride, polytetrafluoroethylene, polyamide, carboxymethyl cellulose or acrylic resin may, for example, be preferably employed.

The powder of the lithium composite oxide of the present invention, the conductive material and the binding material are formed into a slurry or a kneaded product by using a solvent or a dispersion medium, which is supported on a positive electrode current collector such as aluminum foil or stainless steel foil by e.g. coating to form a positive electrode for a lithium secondary battery.

In a lithium secondary battery using the lithium composite oxide of the present invention as the positive electrode active material, as the separator, a porous polyethylene or a porous propylene film may be used. Further, as a solvent of the electrolyte solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or by mixing at least two types. Further, it may be used by mixing with another solvent. Further, according to the material of the negative electrode active material, if the chain carbonate ester is used together with the cyclic carbonate ester, there is a case where the discharge properties, the cyclic durability or the charge and discharge efficiency can be improved.

Further, in the lithium secondary battery using the lithium composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolyte solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. It is preferably added at a concentration of from 0.2 to 2.0 mol/L (liter) to the electrolyte solvent or the polymer electrolyte comprising the lithium salt. If the concentration departs from this range, ionic conductivity will decrease, and the electrical conductivity of the electrolyte will decrease. More preferably, it is from 0.5 to 1.5 mol/L.

In the lithium battery using the lithium composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium composite oxide of the present invention as the positive electrode active material is not particularly limited. Sheet, film, folding, winding type cylinder with bottom or button shape etc. is selected according to use.

EXAMPLES

Now, the present invention will be explained in further detail with reference to Examples. However, the present invention is by no means restricted to such specific Examples.

In the Examples, the X-ray diffraction analyses were carried out by using RINT-2000 model, manufactured by Rigaku Corporation under the conditions of a CuKα tube, a tube voltage of 40 KV, a tube current of 40 mA, a light-receiving slit of 0.15 mm and a sampling width of 0.02°. In the present invention, for the particle size analysis, Microtrac HRA X-100 model, manufactured by Leed+Northrup, was used.

Example 1

Into a reactor, an aqueous sulfate solution containing nickel sulfate, cobalt sulfate and manganese sulfate, aqueous ammonia and an aqueous sodium hydroxide solution were, respectively, continuously supplied, while stirring the interior of the reactor so that the pH of the slurry in the reactor became 10.7, and the temperature became 50° C., and maintaining the atmosphere to be a nitrogen atmosphere except for times when air was intermittently supplied.

The amount of the liquid in the reaction system was adjusted by an overflow system, and the coprecipitation slurry over-flown was subjected to filtration, washing with water and then drying at 70° C. to obtain a nickel-cobalt-manganese complex hydroxide powder. The obtained hydroxide powder was dispersed in a 6 wt % sodium persulfate aqueous solution containing 3 wt % of sodium hydroxide, followed by stirring at 20° C. for 12 hours to obtain a nickel-cobalt-manganese composite oxyhydroxide powder.

To this composite oxyhydroxide powder, a lithium carbonate powder having an average particle size of 20 μm was mixed, followed by firing in the atmosphere at 900° C. for 16 hours, an then by mixing and pulverization to obtain a $LiNi_{1/3}Co_{1/3}Mn_{1/3}O_2$ powder. Further, this powder had a specific surface area of 0.55 m²/g by a nitrogen adsorption method and a volume average particle size D50 of 11.8 μm. The powder X-ray diffraction spectrum using CuKα-ray was analogous to a rhombohedral system (R-3m). By the SEM observation, the powder particles were found to be ones having numerous primary particles agglomerated to form secondary particles, and their shapes were spherical or oval. With respect to the obtained $LiNi_{1/3}Co_{1/3}Mn_{1/3}O_2$ powder, the compression strength was measured by using a microcompression tester (MCT-W500, manufactured by Shimadzu Corporation). Namely, with respect to optional ten particles having known particle sizes, the measurements were carried out by using a flat surface type indenter having a diameter of 50 μm with a test load of 100 mN at a loading rate of 3.874 mN/sec, whereby the compression strength was obtained in accordance with the above-mentioned formula 1 and found to be 87.6 MPa. This powder is designated as the first granular powder.

On the other hand, a nickel-cobalt-manganese composite oxyhydroxide powder was prepared in the same manner as described above except that the atmosphere of the reactor was maintained to be an air atmosphere, and in the same manner as described above, a $LiNi_{1/3}Co_{1/3}Mn_{1/3}O_2$ powder was obtained. Here, this powder had a specific surface area of 0.58 m²/g by a nitrogen adsorption method and a volume average particle size D50 of 13.4 μm. The powder X-ray diffraction spectrum using Cu—Kα-ray was analogous to a rhombohedral system (R-3m). By the SEM observation, the powder particles were found to be ones having numerous primary particles agglomerated to form secondary particles, and their shapes were generally spherical or oval. With respect to the obtained $LiNi_{1/3}Co_{1/3}Mn_{1/3}O_2$ powder, the compression strength was measured in the same manner and found to be 25.3 MPa. This powder is designated as the second granular powder.

The above first granular powder and the second granular powder were mixed in a weight ratio of 75:25 to obtain a mixed positive electrode powder. The press density of the mixed positive electrode powder was 3.20 g/cc.

This mixed positive electrode powder, acetylene black, graphite powder and a PVDF binder were mixed in a solid content weight ratio of 88/3/3/6, and an N-methyl pyrrolidone solvent was added, followed by mixing by a ball mill to obtain a coating slurry. This slurry was applied on one side of an aluminum foil current collector having a thickness of 20 μm, by a doctor blade system, and the solvent was removed by hot air drying, followed by roll pressing to obtain a positive electrode sheet.

Using this positive electrode sheet as a positive electrode, using a porous polypropylene having a thickness of 25 μm as a separator, using a metal lithium foil having a thickness of 500 μm as a negative electrode, using a nickel foil of 20 μm as a negative electrode current collector and using 1M $LiPF_6$/EC+DEC (1:1) as an electrolyte, a simple sealed cell type lithium battery made of stainless steel was assembled in an argon globe box. This battery was firstly charged by CC-CV up to 4.3 V at a load current of 20 mA per 1 g of the positive electrode active material at 25° C., and discharged down to 2.5 V at a load current of 20 mA per 1 g of the positive electrode active material, whereby the initial discharge capacity was obtained. Further, the charge and discharge cycle test was carried out 30 times.

As a result, the initial weight discharge capacity density at a voltage of from 2.5 to 4.3 V at 25° C. was 160 mAh/g, the initial volume discharge capacity density was 466 mAh/cc-electrode layer, the initial charge and discharge efficiency was 90%, and the capacity retention after 30 times of charge and discharge cycle was 97.5%.

Example 2

In Example 1, the first granular powder and the second granular powder were mixed in a weight ratio of 60:40. The press density of the mixed positive electrode powder was 3.17 g/cc. In the same manner as in Example 1, a positive electrode sheet was prepared, and using this positive electrode sheet as a positive electrode, a simple sealed cell made of stainless steel was assembled, and the charge and discharge performance was evaluated in the same manner as in Example 1. As a result, the initial weight discharge capacity density at 25° C. was 160 mAh/g, the initial volume discharge capacity density was 461 mAh/cc-electrode layer, and the initial charge and discharge efficiency was 90.3%. Further, the capacity retention after 30 times of charge and discharge cycle was 97.2%.

Example 3

In Example 1, the first granular powder and the second granular powder were mixed in a weight ratio of 85:15. The press density of the mixed positive electrode powder was 3.13 g/cc. In the same manner as in Example 1, a positive electrode sheet was prepared, and using this positive electrode sheet as a positive electrode, a simple sealed cell made of stainless steel was assembled, and the charge and discharge performance was evaluated in the same manner as in Example 1. As a result, the initial weight discharge capacity density at 25° C. was 160 mAh/g, the initial volume discharge capacity density was 455 mAh/cc-electrode layer, and the initial charge and discharge efficiency was 90.2%. Further, the capacity retention after 30 times of charge and discharge cycle, was 97.1%.

Example 4

In Example 1, a composite hydroxide was obtained under a starting material coprecipitation condition for $LiNi_{1/3}Co_{1/3}Mn_{1/3}O_2$ of the first granular powder, while stirring the interior of the reactor so that the pH became 11.0 and the temperature became 50° C., and maintaining the atmosphere to be a nitrogen atmosphere except for times when air was intermittently supplied, and then a composite oxyhydroxide was prepared, and in the same manner as in Example 1, a $LiNi_{1/3}Co_{1/3}Mn_{1/3}O_2$ powder was obtained. This powder had a specific surface area of 0.50 m²/g and a volume average particle size D50 of 9.8 μm and was substantially spherical, wherein primary particles were agglomerated to form secondary particles. The compression breaking strength of the particles was 110 MPa.

Except that this powder was used as the first granular powder, in the same manner as in Example 1, the 15 powder having a compression breaking strength of 25.3 MPa was used as the second granular powder, and in the same manner as in Example 1, they were mixed at a ratio of 75:25. The press density of the obtained mixed positive electrode powder was measured and found to be 3.25 g/cc. Further, the initial weight discharge capacity density was 160 mAh/g, the initial volume discharge capacity density was 481 mAh/cc-electrode layer, the initial charge and discharge efficiency was 90.1%, and the capacity retention after 30 cycles was 97.3%.

Example 5

A first granular powder was prepared in the same manner as in Example 1 except that in the preparation of the first granular powder in Example 1, a lithium carbonate powder, a magnesium hydroxide powder and a lithium fluoride powder were added to the nickel-cobalt-manganese composite oxyhydroxide powder. The composition of this powder was $Li(Ni_{1/3}Co_{1/3}Mn_{1/3})_{0.99}Mg_{0.01}O_{1.99}F_{0.01}$. Further, this powder had a specific surface area of 0.66 m$^2$/g and a volume average particle size of 11.5 μm, and the crystal structure was R-3m, and the compression strength was 85.3 MPa.

Except that the above first granular powder was employed, the operation was carried out in the same manner as in Example 1. The first granular powder and the second granular powder were mixed in a weight ratio of 75:25 to obtain a mixed positive electrode powder. As a result, this mixed powder had a press density of 3.21 g/cc, the initial weight discharge capacity density was 160 mAh/g, the initial volume discharge capacity density was 468 mAh/cc-electrode layer, the initial charge and discharge efficiency was 92.2%, and the capacity retention after 30 times of charge and discharge cycle, was 98.5%.

Example 6

A first granular powder was prepared in the same manner as in Example 1 except that in the preparation of the first granular powder in Example 1, a lithium carbonate powder and an aluminum hydroxide powder were added to the nickel-cobalt-manganese composite oxyhydroxide powder. The composition of the powder was $Li(Ni_{1/3}Co_{1/3}Mn_{1/3})_{0.99}Al_{0.01}O_2$. Further, the powder had a specific surface area of 0.60 m$^2$/g and a volume average particle size of 11.7 μm, and the crystal structure was R-3m, and the compression strength was 88.3 MPa.

Except that the above first granular powder was employed, the operation was carried out in the same manner as in Example 1. The first granular powder and the second granular powder were mixed in a weight ratio of 75:25 to obtain a mixed positive electrode powder. As a result, this mixed powder had a press density of 3.19 g/cc, the initial weight discharge capacity density was 160 mAh/g, the initial volume discharge capacity density was 464 mAh/cc-electrode layer, the initial charge and discharge efficiency was 92.0%, and the capacity retention after 30 times of charge and discharge cycle, was 98.3%.

Example 7

A first granular powder was prepared in the same manner as in Example 1 except that in the preparation of the first granular powder in Example 1, a lithium carbonate powder and a zirconium oxide powder were added to the nickel-cobalt-manganese composite oxyhydroxide power. The composition of the powder was $Li(Ni_{1/3}Co_{1/3}Mn_{1/3})_{0.99}Zr_{0.01}O_2$. Further, the powder had a specific surface area of 0.63 m$^2$/g and a volume average particle size of 11.5 μm, and the crystal structure was R-3m, and the compression breaking strength was 87.3 MPa.

Except that the above first granular powder was employed, the operation was carried out in the same manner as in Example 1. The first granular powder and the second granular powder were mixed in a weight ratio of 75:25 to obtain a mixed positive electrode powder. As a result, this mixed powder had a press density of 3.20 g/cc, the initial weight discharge capacity density was 160 mAh/g, the initial volume discharge capacity density was 466 mAh/cc-electrode layer, the initial charge and discharge efficiency was 92.5%, and the capacity retention after 30 times of charge and discharge cycle, was 98.8%.

Comparative Example 1

A positive electrode powder was obtained in the same manner as in Example 1 except that only the first granular powder was employed. The press density of the positive electrode powder was measured and found to be 3.04 g/cc. The initial volume discharge capacity density was 432 mAh/cc-electrode layer.

Comparative Example 2

A positive electrode powder was obtained in the same manner as in Example 1 except that only the second granular powder was employed. The press density of the positive electrode powder was measured and found to be 3.02 g/cc. The initial volume discharge capacity density was 428 mAh/cc-electrode layer.

The entire disclosure of Japanese Patent Application No. 2003-208311 filed on Aug. 21, 2003 including specification, claims and summary is incorporated herein by reference in its entirety.

What is claimed is:

1. A positive electrode active material powder for a lithium secondary battery characterized by comprising a first granular powder having a compression breaking strength of at least 50 MPa and a second granular powder having a compression breaking strength of less than 40 MPa, formed by agglomeration of many fine particles of a lithium composite oxide represented by the formula $Li_pNi_xCo_yMn_zM_qO_{2-a}F_a$ (wherein M is Al, an alkaline earth metal element or a transition metal element other than Ni, Co and Mn, $0.9 \leq p \leq 1.1$, $0.2 \leq x \leq 0.8$, $0 \leq y \leq 0.4$ $0.10 \leq z \leq 0.42$, y+z>0, $0 \leq q \leq 0.05$, $1.9 \leq 2-a \leq 2.1$, x+y+z+q=1, and $0 \leq a \leq 0.02$) to have an average particle size D50 of from 3 to 15 μm, in a weight ratio of the first granular powder/the second granular powder being from 50/50 to 90/10; wherein the ratio of the compression strength of the first granular powder/the compression strength of the second granular powder is from 65/30 to 200/10.

2. The positive electrode active material powder for a lithium secondary battery according to claim 1, wherein M is at least one element selected from the group consisting of Ti, Zr, Hf, V, Nb, Ta, Mg, Ca, Sr, Ba and Al.

3. The positive electrode active material powder for a lithium secondary battery according to claim 1, wherein M is at least one element selected from the group consisting of Ti, Zr, Hf, Mg and Al.

4. The positive electrode active material powder for a lithium secondary battery according to claim 1, wherein the specific surface area of the positive electrode active material powder is from 0.3 to 2.0 m$^2$/g, and the grain shape is substantially spherical.

5. The positive electrode active material powder for a lithium secondary battery according to claim 1, wherein the press density of the positive electrode active material powder is from 3.1 to 3.4 g/cm$^3$.

6. A positive electrode for a lithium secondary battery containing the positive electrode active material powder as defined in claim 1.

7. A lithium secondary battery employing the positive electrode as defined in claim 6.

8. A method of making a positive electrode active material powder, the method comprising firing at a temperature in a range of from 700° C. to 1050° C. a mixture comprising a lithium source, a nickel source, at least one of a cobalt source and a manganese source, an optional element M source, and an optional fluorine source; and producing the powder of claim 1.

9. The positive electrode active material powder for a lithium secondary battery according to claim 1, wherein the compression breaking strength of the first granular powder is from 80 to 300 MPa and the compression breaking strength of the second granular powder is from 10 to 30 MPa.

* * * * *